(12) United States Patent
Choi

(10) Patent No.: US 6,178,104 B1
(45) Date of Patent: Jan. 23, 2001

(54) POWER FACTOR CORRECTION CIRCUIT USING REVERSE SAWTOOTH WAVES

(75) Inventor: Nak-Choon Choi, Kyungki-do (KR)

(73) Assignee: Samsung Electronics, Co., Ltd., Suwon (KR)

( * ) Notice: Under 35 U.S.C. 154(b), the term of this patent shall be extended for 0 days.

(21) Appl. No.: 09/313,505

(22) Filed: May 17, 1999

(30) Foreign Application Priority Data

May 15, 1998  (KR) ................................................ 98-17504

(51) Int. Cl.[7] ................................ H02M 7/04; G05F 1/10
(52) U.S. Cl. ................................ 363/89; 363/81; 323/222
(58) Field of Search .................................. 363/89, 17, 90, 363/81; 323/222, 285, 286, 288, 282; 327/118

(56) References Cited

U.S. PATENT DOCUMENTS

| | | | |
|---|---|---|---|
| 3,678,331 | * 7/1972 | Fischman | 315/389 |
| 5,001,620 | * 3/1991 | Smith | 363/89 |
| 5,003,454 | * 3/1991 | Bruning | 363/81 |
| 5,804,950 | * 9/1998 | Hwang et al. | 323/222 |

* cited by examiner

Primary Examiner—Peter S. Wong
Assistant Examiner—Rajnikant B. Patel
(74) Attorney, Agent, or Firm—Marger Johnson & McCollom, P.C.

(57) ABSTRACT

A Power Factor Correction (PFC) circuit according to the present invention includes a boost converter which outputs a predetermined voltage according to control of a switch. The switch is coupled to a resistor and a capacitor which, by forming a current detector, detect the current flowing through an inductor of the boost converter. The output voltage of the boost converter is divided by resistors, and the voltage difference between the divided voltage and a reference voltage is amplified by an error amplifier. The output voltage of the error amplifier and a reverse sawtooth waveform provided from an oscillator are input in a multiplier so as to be multiplied by a gain, and output voltages of the multiplier and of the current detector are provided to a switching driver. The switching driver turns off the switch when the output voltages of the current detector and of the multiplier are equal, and turns on the switch when the state of the reference clock signal is changed.

18 Claims, 8 Drawing Sheets

POWER FACTOR CORRECTION CIRCUIT USING REVERSE SAWTOOTH WAVES

CROSS REFERENCE TO RELATED APPLICATIONS

This application claims priority from Korean Priority Document No. 1998-17504, filed on May 15, 1998 with the Korean Industrial Property Office, which document is hereby incorporated by reference.

BACKGROUND OF THE INVENTION

1. Field of the Invention

The present invention relates to a power factor correction (PFC) circuit, and more particularly to a PFC circuit using reverse sawtooth waves and controlling slope of the current.

2. Description of the Related Art

A continuous current mode (CCM) control method is commonly used in conventional PFC circuits. Among the different types of CCM control methods for improving the power factor are a peak current control method, a variable hysteresis control method, and an average current control method. Each of these methods has the advantage of being able to obtain a high power factor.

However, the above different types of CCM control methods have serious drawbacks. That is, in the peak current control method, because of the occurrence of external inductor current distortion and dead angle distortion, and the need to maintain a maximum duty at below 50%, control by precise correction is not possible. Also, with the variable hysteresis control method, when input voltage decreases, there is a significant increase in frequencies to control the inductor current. Therefore, the frequency control is limited according to the input voltage. Finally, in the average current control method, very complicated processes are used in trying to obtain a power factor of 1.00, or unity.

SUMMARY OF THE INVENTION

The present invention overcomes the above mentioned problems.

It is an object of the present invention to provide a power factor correction circuit using reverse sawtooth waves, to derive a high power factor correction with a minimal limitation in a duty ratio.

The invention provides a power factor correction circuit comprising a converter, a current detector, an error amplification unit, a comparative wave generator, and a switching driving means.

The converter includes an inductor coupled to an input voltage, a switch controlling the current flowing through the inductor, and a rectifier for rectifying the output voltage of the inductor and supplying the rectified voltage to a load.

The current detector detects the current flowing through the inductor when the switch is turned on.

The error amplification unit includes a first voltage divider for dividing the output voltage of the converter, and an error amplifier amplifying a difference voltage between the divided voltage and a first reference voltage.

The comparative wave generator includes an oscillator generating reverse sawtooth waves and a reference clock signal having a frequency identical to the clock frequency, and in phase with it.

In one aspect, the invention the composite wave generator also includes a multiplier multiplying the output voltage of the error amplifier and a reverse sawtooth waveform by a predetermined gain.

The switching driving means turns off the switch when the output voltage of the current detector is equal to the output voltage of the multiplier, and turns on the switch when the state of the reference clock signal is changed.

In another aspect of the present invention, the comparative wave generator also includes a first subtractor subtracting a second reference voltage from the output voltage of the error amplifier, a second subtractor subtracting the output voltage of the first subtractor from a third reference voltage, a first multiplier multiplying the reverse sawtooth waves and the output voltage of the first subtractor by a first gain, and a second multiplier multiplying the output voltage of the second subtractor and the output voltage of the current detector by a second gain.

The switching driving means turns off the switch when the output voltage of the first multiplier is equal to the output voltage of the second multiplier, and turns on the switch when the state of the reference clock signal is changed.

In the other aspect of the present invention, the comparative wave generator also includes a divider dividing the first gain by the output voltage of the error amplifier, a first multiplier multiplying the reverse sawtooth waves and the output voltage of the error amplifier by a second gain, and a second multiplier multiplying the output of the divider and the output voltage of the current detector by a third gain.

The switching driving means turns off the switch when the output voltage of the first multiplier is equal to the output of the second multiplier, and turns on the switch when the state of the reference clock signal is changed.

BRIEF DESCRIPTION OF THE DRAWINGS

The accompanying drawings, which are incorporated in and constitute a part of the specification, illustrate preferred embodiments of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
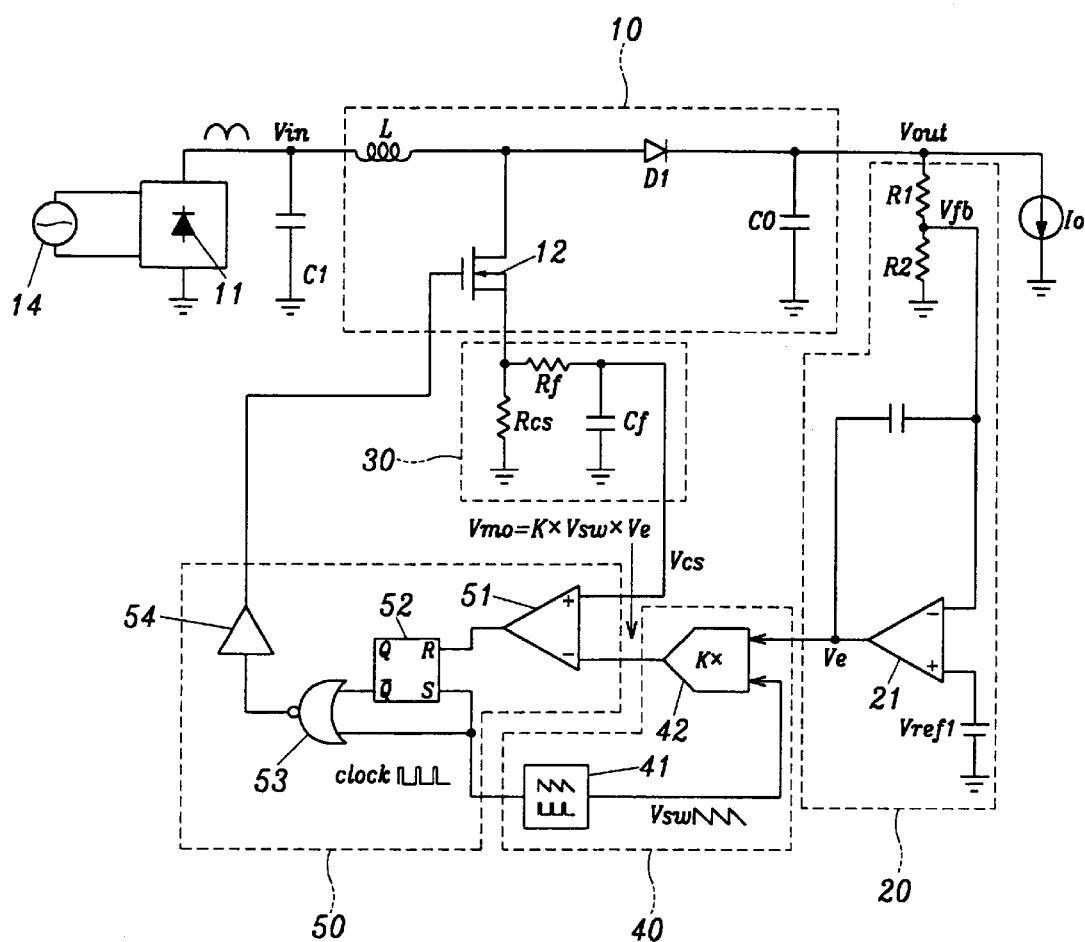
FIG. 1 is a schematic diagram of a PFC circuit according to a first preferred embodiment of the present invention.

It will be immediately apparent that the invention can work with a variety of types of input voltages. In the example of FIG. 1, power from an AC power source 14 is rectified through a diode bank 11, and a resulting voltage is smoothened through a capacitor C1, to produce a voltage Vin.

FIG. 1 shows a schematic diagram of a PFC circuit according to a first preferred embodiment of the present invention. The PFC circuit includes a boost converter 10 receiving voltage Vin, an error amplification unit 20, a current detector 30, a comparative wave generator 40, and a switching driver 50.

The boost converter 10 receives Vin and generates an output voltage Vout to a secondary load, according to the operation of a switching transistor. The boost converter 10 includes an inductor L which stores magnetic energy due to the primary current in a coil to induce current to a secondary side, a switching MOSFET 12 for controlling a current flowing through the inductor L, and a rectifier for rectifying an output voltage of the inductor L to supply the output voltage Vout to a load side. The rectifier can be made by diode D1 and a capacitor C0.

The error amplification unit 20 compares an output voltage Vout of the boost converter 10 to a first reference voltage, then amplifies a resulting comparative value. The error amplification unit 20 includes a voltage divider made from resistors R1 and R2 for dividing the output voltage Vout to produce voltage Vfb. Unit 20 further includes an error amplifier 21 for amplifying a difference between the voltage Vfb and a reference voltage Vref1, to produce a voltage Ve.

The current detector 30 detects current flowing to the inductor L of the boost converter 10 when the switching MOSFET 12 is on. The current detector 30 includes a resistor Rcs and a capacitor Cf.

The comparative wave generator 40 generates comparative waves for comparison with an output voltage Vcs of the current detector 30. The comparative wave generator 40 includes an oscillator 41 for generating reverse sawtooth waves Vsw, which are also known as a reverse sawtooth waveform. This waveform includes repeating segments that start to decrease at the start of each sawtooth period. The oscillator further generates a reference clock signal of a clock period identical to the sawtooth period. They are in phase, in that it becomes HI (i.e., changes to an ON state) at the start of each period.

Generator 40 further includes a multiplier 42 for calculating a product of a gain K, the reverse sawtooth waves Vsw, and the output voltage Ve of the error amplification unit 20.

The switching driver 50 generates a drive voltage for turning on and off the switching MOSFET 12. The switching driver 50 includes a comparator 51 for comparing the output voltage Vcs of the current detector 30 with an output value Vmo of the multiplier 42; a flip flop 52 for receiving both an output of the comparator 51 as a reset signal and the reference clock signal synchronized to the reverse sawtooth waves as a set signal; a logical NOR gate 53 for performing a NOR operation on an inverted output $\overline{Q}$ of the flip flop 52 and the reference clock signal; and a drive circuit 54 for driving a gate of the switching MOSFET 12 using an output of the NOR gate 53.

The operation of the PFC circuit according to the first preferred embodiment of the present invention will now be described with reference to FIGS. 1 and 2.

A relation between an input voltage Vin and the output voltage Vout of the boost converter 10 is shown below.

$$\frac{Vout}{Vin} = \frac{1}{1 - \frac{t_{on}}{T}} = \frac{1}{1-D} \qquad \text{Equation (1)}$$

where T is a time interval of one period, $t_{on}$ is the time when the switching MOSFET 12 is on during one period (i.e., switching on-time), and D is a duty ratio (i.e., a ratio between the time the switching MOSFET 12 is on $t_{on}$ to the time interval of one period T). One period T equals the sum of $t_{on}$ and $t_{off}$ ($t_{off}$ is the time during which MOSFET 12 is switched off). The period T is the same for the sawtooth period and for the clock period.

As shown in Equation 1, the output voltage Vout of the boost converter 10 is determined by the input voltage Vin and the duty ratio D. Accordingly, the output voltage Vout can be controlled by adjusting the switching on-time of the switching MOSFET 12. This control of the switching MOSFET 12 (to on and off), as described above, is performed by the generation of the drive voltage by the switching driver 50.

In more detail, the turning on of the switching MOSFET 12 is determined by the reference clock signal of the oscillator 41 input to the set signal terminal S of the flip-flop 52. That is, in the case where the reference clock signal of the oscillator 41 is at a rising edge, the inverted output $\overline{Q}$ of the flip-flop 52 outputs a low output value. This low output value and the reference clock signal of the oscillator 41 are output to the NOR gate 53 such that the switching MOSFET 12 is turned on.

With regard to the turning off of the switching MOSFET 12, this is determined by the output voltage Vcs of the current detector 30 and the output value Vmo of the multiplier 42, respective input signals to the comparator 51. That is, if the output voltage Vcs of the current detector 30 and the output value Vmo of the multiplier 42 become equal, the comparator 51 outputs a high signal such that the flip-flop 52 is reset and the inverted output $\overline{Q}$ of the flip-flop 52 is changed to a high state. Subsequently, the inverted output $\overline{Q}$ of the flip-flop 52 passes through the logical NOR gate 53 and the drive circuit 54 to turn off the switching MOSFET 12.

An interval at which the switching MOSFET 12 is turned on will be described in detail hereinafter with reference to FIGS. 1 and 2.

As shown in Equation 2 below, the output value Vmo of the multiplier 42 is a value obtained by a product of the gain K, the output voltage Ve of the error amplifier 21, and the reverse sawtooth waves Vsw.

$$Vmo = K \cdot Ve \cdot Vsw \qquad \text{Equation (2)}$$

Accordingly, the output value Vmo of the multiplier 42 can vary by the output voltage Ve of the error amplifier 21.

Figure 2:
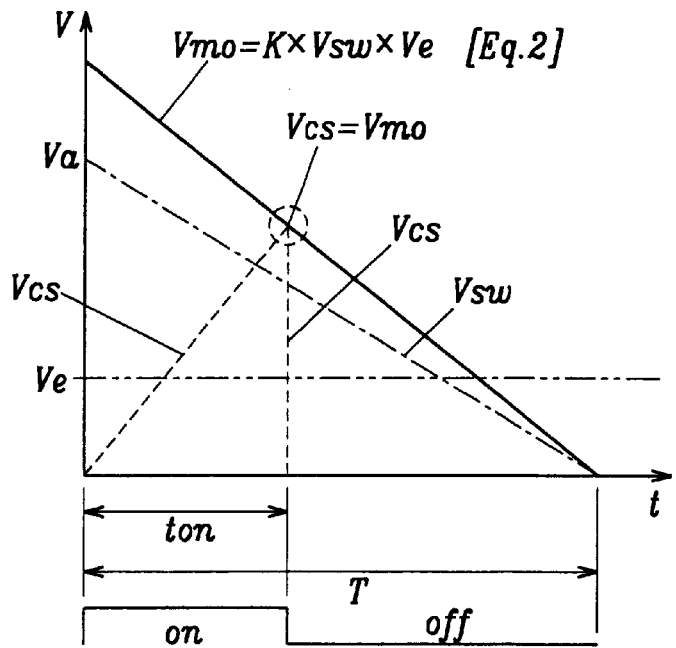
FIG. 2 is a graph illustrating the values of parameters during the ON, OFF times of a switching MOSFET (Metal Oxide Semiconductor Field-Effect Transistor) shown in FIG. 1.

The output voltage Vcs of the current detector 30, as shown in FIG. 2, starts to increase at a point when the switching MOSFET 12 is turned on (i.e., at a point where the reference clock signal of the oscillator 41 changes to a rising edge). The output voltage Vcs of the current detector 30 continues to increase and eventually becomes equal with the output value Vmo of the multiplier 42, and at this point, the switching MOSFET 12 is turned off. The switching MOSFET 12 is again turned on at the point where the reference clock signal of the oscillator 41 changes to a rising edge.

Equation 3 below shows a relation between the output voltage Vcs of the current detector 30 and the output value Vmo of the multiplier 42 at the point where they become equal.

$$Vcs = K \cdot Ve \cdot Va \left(1 - \frac{t_{on}}{T}\right) \qquad \text{Equation (3)}$$

where Va is a sawtooth wave voltage at the point where the switching MOSFET 12 is turned on, and T is the period of the reverse sawtooth waves.

By substituting a result of Equation 1 into Equation 3, one obtains:

$$Vcs = K \cdot Ve \cdot Va \frac{Vin}{Vout} \qquad \text{Equation (4)}$$

The output voltage Vcs of the current detector 30 is derived from:

$$Vcs = iL \cdot Rcs \qquad \text{Equation (5)}$$

where iL is the current flowing to the inductor L, and Rcs is the resistance value of resistor Rcs.

By substituting Equation 4 into Equation 5, the following equation is derived for iL.

$$iL = \frac{K \cdot Ve \cdot Va \cdot Vin}{Vout \cdot Rcs} \qquad \text{Equation (6)}$$

A predetermined gain Gm is advantageously defined as follows:

$$Gm = \frac{K \cdot Ve \cdot Va}{Vout \cdot Rcs} \qquad \text{Equation (7)}$$

Substituting Equation 7 into Equation 6 one obtains:

$$iL = Gm \cdot Vin \qquad \text{Equation (8)}$$

In Equation 8, it is shown that a size of the current iL flowing through inductor L is determined by a proportional relation between the input voltage Vin and a predetermined gain Gm. The current iL is also in phase with the input voltage Vin. That is, the waveform of the current iL flowing through the inductor L is identical to the waveform of the input voltage Vin. This indicates that the PFC circuit according to the first preferred embodiment of the present invention can provide a high power factor.

The operation of the PFC circuit of the first preferred embodiment where the output voltage Vout varies will now be described with reference to FIGS. 1 and 3.

It is to be assumed that the output voltage Vout is reduced to an output voltage Vout' by changes in load. As a result, the voltage Vfb is reduced such that the output voltage Ve of the error amplifier 21 is increased to an output voltage Ve'. This increases the output value Vmo of the multiplier 42 to an output value Vmo' as shown in FIG. 3.

Figure 3:
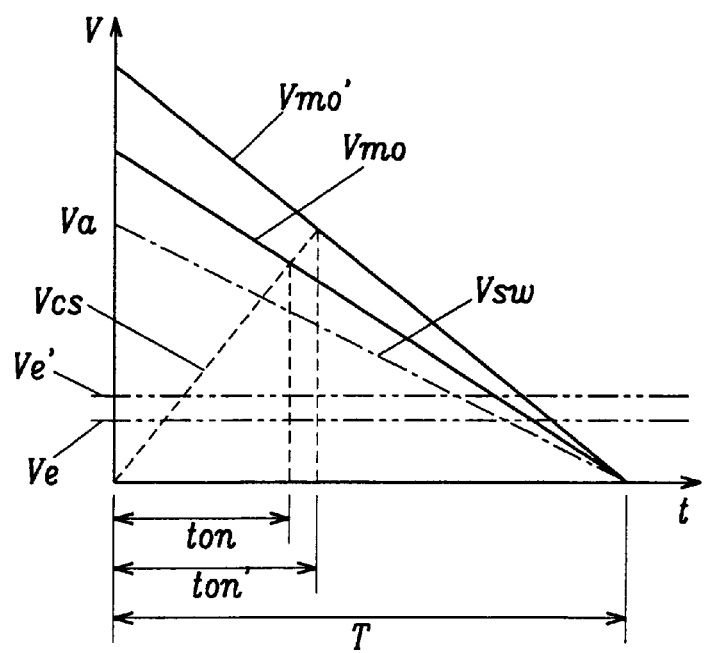
FIG. 3 is a graph illustrating duty ratio and operating point changes according to fluctuations in an output voltage of FIG. 2.

In the above, since the output voltage Ves of the current detector 30 has a constant slope, the ON interval of the switching MOSFET 12 $t_{on}$ increases to $t_{on}'$ as shown in FIG. 3. Hence, the duty ratio is increased and the output voltage Vout is increased as shown by Equation 1. Similarly, when the output voltage Vout is increased according to the fluctuation in load, the duty ratio is reduced and hence, the output voltage Vout is reduced.

However, the PFC circuit according to the first embodiment of the present invention has a limitation on obtaining a maximal duty ratio, which will be described below.

For instance, although the output voltage Vout is reduced and a slope of the output voltage Vmo of the multiplier is increased, the increase of the slope has a limitation. That is, although the output voltage Vout is reduced, the maximal output value Ve of the error amplifier is limited, and accordingly, the increase of the slope of the output voltage Vmo of the multiplier is limited. Therefore, since the output voltage of the current detector 30 has a constant slope, an actual maximal duty ratio is limited. Accordingly, in case of heavy load, the duty on time is limited, and controlling the output voltage Vout becomes difficult.

A PFC circuit according to a second and third embodiments of the present invention are now disclosed. As will be appreciated, they do not share the above-noted limitation of the first embodiment.

Figure 4:
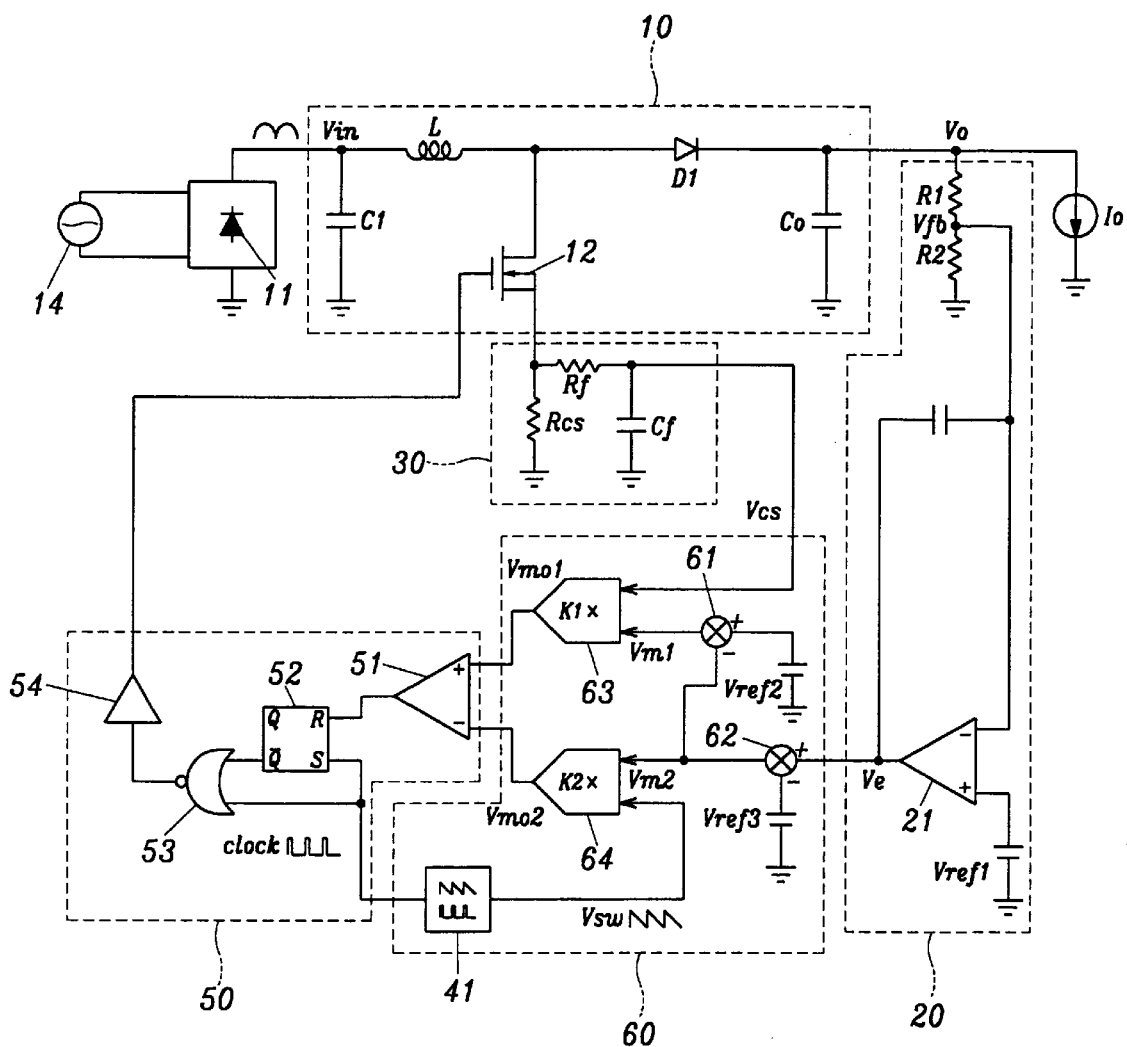
FIG. 4 is a schematic diagram of a PFC circuit according to a second preferred embodiment of the present invention.

FIG. 4 shows a PFC circuit according to the second embodiment of the present invention, including a boost converter 10, an error amplification unit 20, a current detector 30, a comparative wave generator 60, and a switching driver 50. The operations of the boost converter 10, the error amplification unit 20, the current detector 30, and the switching driver 50 as shown in FIG. 4 are identical with those of the PFC circuit shown in FIG. 1.

The comparative wave generator 60 for providing the comparative waves to determine the point at which the switching MOSFET 12 is turned off, is comprised of subtractors 61 and 62, and multipliers 63 and 64.

The subtractor 62 subtracts the reference voltage Vref3 from the output voltage Ve of the error amplifier 21, and outputs Vm2 (i.e., Vm2=Ve−Vref3). The subtractor 61 subtracts the output voltage Vm2 of the subtractor 62 from the reference voltage Vref2, and outputs Vm1 (i.e., Vm1= Vref2−Vm2=Vref2+Vref3−Ve).

The multiplier 63 multiplies the output voltage Vcs of the current detector 30 and the output voltage Vm1 of the subtractor 61 by a gain K1, and outputs Vmo1. The multiplier 64 multiplies the sawtooth wave Vsw and the output voltage Vm2 of the subtractor 62 by a gain K2, and outputs Vmo2. The values of output voltages Vmo1 and Vmo2 of the multipliers 63 and 64 are given by Equations 9 and 10, respectively:

$$Vmo1 = K1 \cdot (Vref2 + Vref3 - Ve) \cdot Vcs \qquad \text{Equation (9)}$$

$$Vmo2 = K2 \cdot (Ve - Vref3) \cdot Vsw = G_{10} \cdot Vsw \qquad \text{Equation (10)}$$

Figure 5:
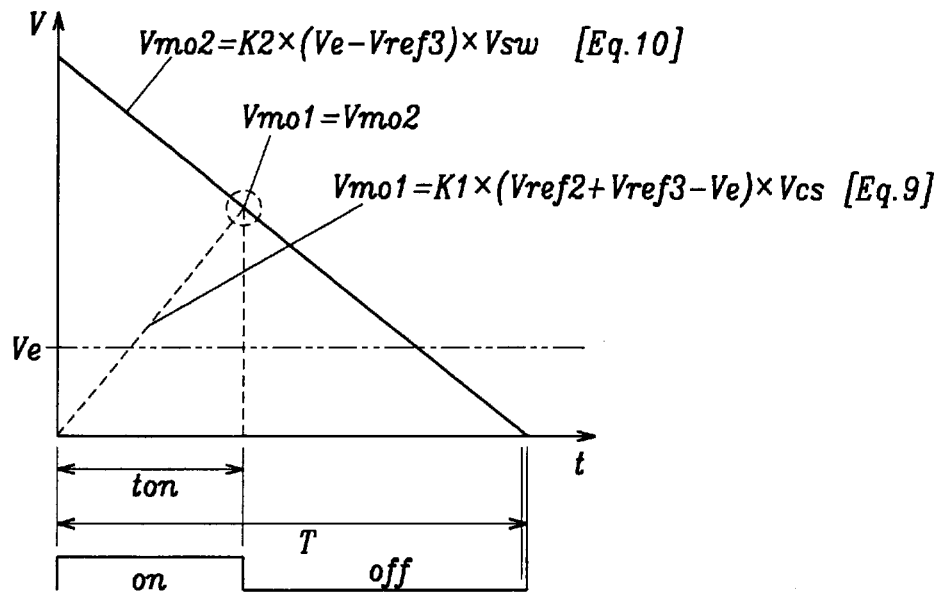
FIG. 5 is a graph illustrating the values of parameters during ON, OFF times of a switching MOSFET shown in FIG. 4.

Referring to FIGS. 4 and 5, the operation of the PFC circuit will be described according to the second embodiment of the present invention. The point at which the switching MOSFET is turned on is determined by the reference clock signal of the oscillator 41 provided to the set signal terminal of the flip-flop 52, and the point at which the switching MOSFET is turned off is determined by the output signals Vmo1 and Vmo2 of the multipliers 63 and 64 provided to the comparator 51, respectively.

Referring to FIG. 5, the output voltage Vmo2 of the multiplier 64 is, as shown by Equation 10, a product of the reverse sawtooth waves Vsw and a gain $G_{10}$.

Because the output voltage Vmo1 of the multiplier 63 is proportional to the output voltage Vcs of the current detector 30 as shown by Equation 9, the same voltage Vmo1 starts to increase when the switching MOSFET 12 is turned on (i.e., the point at which the reference clock signal of the oscillator 41 changes to a rising edge). As the output voltage Vmo1 of the multiplier 63 increases, the voltage Vmo1 becomes equal to the output voltage Vmo2 of the multiplier 64, and at this point, the switching MOSFET 12 is turned off. This switching MOSFET 12 is turned on when the reference clock signal of the oscillator 41 changes to a rising edge, and repeats above process.

A relation Equation of Vmo1 and Vmo2, when the output voltages Vmo1 and Vmo2 of the multipliers 63 and 64 become equal, is found by setting Vmo1=Vmo2, and substituting in from Equations 9 and 10, as follows:

$$K1 \cdot (Vref2 + Vref3 - Ve) \cdot Vcs = \quad \text{Equation (11)}$$
$$K2(Ve - Vref3) \cdot Va \cdot \left(1 - \frac{t_{on}}{T}\right)$$

where, Va is a peak voltage of the reverse sawtooth waves when the switching MOSFET is turned on, and T is the period of the reverse sawtooth waves.

By substituting Equations 1 and 5 into Equation 11, one obtains:

$$iL = \frac{K2 \cdot (Ve - Vref3) \cdot Va \cdot Vin}{K1 \cdot (Vref2 + Vref3 - Ve) \cdot Rcs \cdot Vout} \quad \text{Equation (12)}$$
$$= Gm1 \cdot Vin$$

From Equation 12, it is shown that a magnitude of the current iL flowing through the inductor L is determined by the input voltage Vin and a constant gain Gm1, and has identical phase with the input voltage. That is, the waveforms of the current iL flowing to the inductor correspond to those of the input voltage, and accordingly, the PFC circuit according to the second embodiment of the present invention enables high power factor correction.

Figure 6:
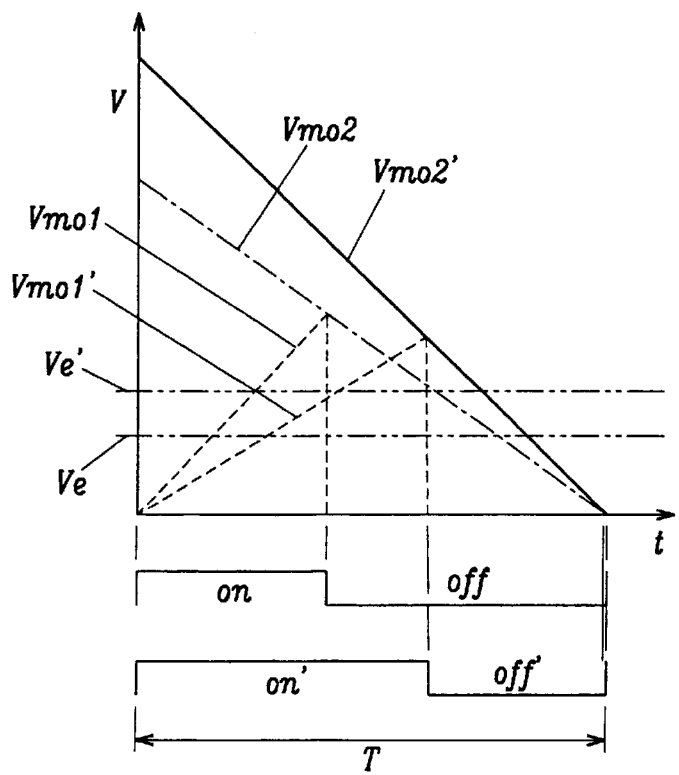
FIG. 6 is a graph illustrating duty ratio and operating point changes where output voltage is reduced by an increase in load of FIG. 4.
Figure 7:
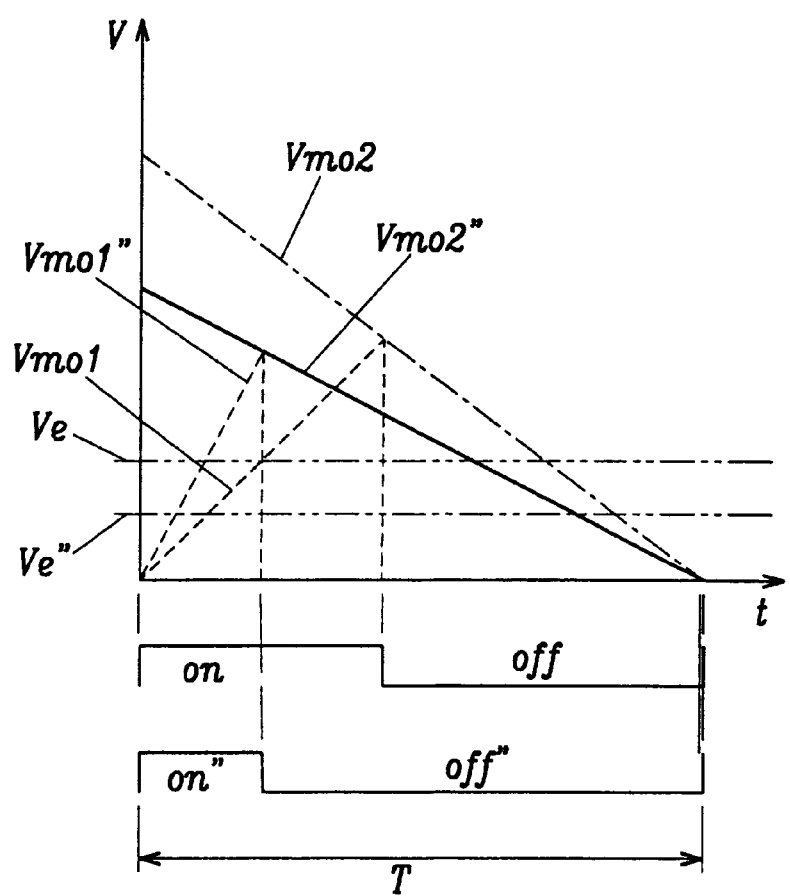
FIG. 7 is a graph illustrating duty ratio and operating point changes where output voltage is increased by a reduction in load of FIG. 4.

Next, the operation of the PFC circuit according to the second embodiment of the present invention will be described when the output voltage Vout is fluctuated with reference to FIGS. 4, 6, and 7. FIG. 6 shows a graph where output voltage Vout is reduced by an increase in load, and FIG. 7 shows a graph where output voltage Vout is increased by a reduction in load.

It is assumed that the load is increased and the output voltage Vout of the boost converter is reduced to Vout'. Then, the voltage produced by the division of the resistors R1 and R2 is reduced, and the output voltage Ve of the error amplifier 21 is increased to Ve'. Therefore, the slope of the output voltage Vmo2 of the multiplier 64 is, as shown in FIG. 6, is shifted to Vmo2', and the slope of the output voltage Vmo1 of the multiplier 63 is shifted to Vmo1'. Hence, since the on interval $t_{on}$ of the switching MOSFET 12 is increased to $t_{on}'$, the output current is increased and the output voltage Vout is increased. In FIG. 7, it is assumed that the load is reduced and the output voltage Vout of the boost converter 10 is increased to Vout". Then, the voltage Vfb divided by the resistors R1 and R2 is increased, and the output voltage Ve of the error amplifier 21 is reduced to Ve". Therefore, the slope of the output voltage Vmo2 of the multiplier 64 is, as shown in FIG. 7, is shifted to Vmo2", and the slope of the output voltage Vmo1 of the multiplier 63 is shifted to Vmo1". Hence, since the on interval $t_{on}$ of the switching MOSFET 12 is reduced to $t_{on}"$, the output current is reduced and the output voltage Vout is reduced.

The PFC circuit according to the second embodiment of the present invention has a minimal limitation in a duty ratio, that is, current control, as described below.

For example, if it is set that the output voltage Vout is reduced and the output Ve value of the error amplifier 21 is approached to almost Vref2+Vref3, the output voltage Vmo1 of the multiplier 63 is reduced to almost 0, as shown by Equation 9. Therefore, the on interval of the switching MOSFET 12 is increased and the duty ratio becomes almost 1.

If it is set that the output voltage Vout is increased and the output Ve value of the error amplifier 21 is approached to almost Vref3, the output voltage Vmo2 of the multiplier 64 is reduced to almost 0, as shown by Equation 10. Therefore, the on interval of the switching MOSFET 12 is reduced and the duty ratio becomes almost 0.

Since the PFC circuit according to the second embodiment of the present invention is able to control the duty ratio from almost 0 to 1, the fluctuation of the duty ratio can be minimized or maximized in the case of the fluctuation of the load or input voltage.

Figure 8:
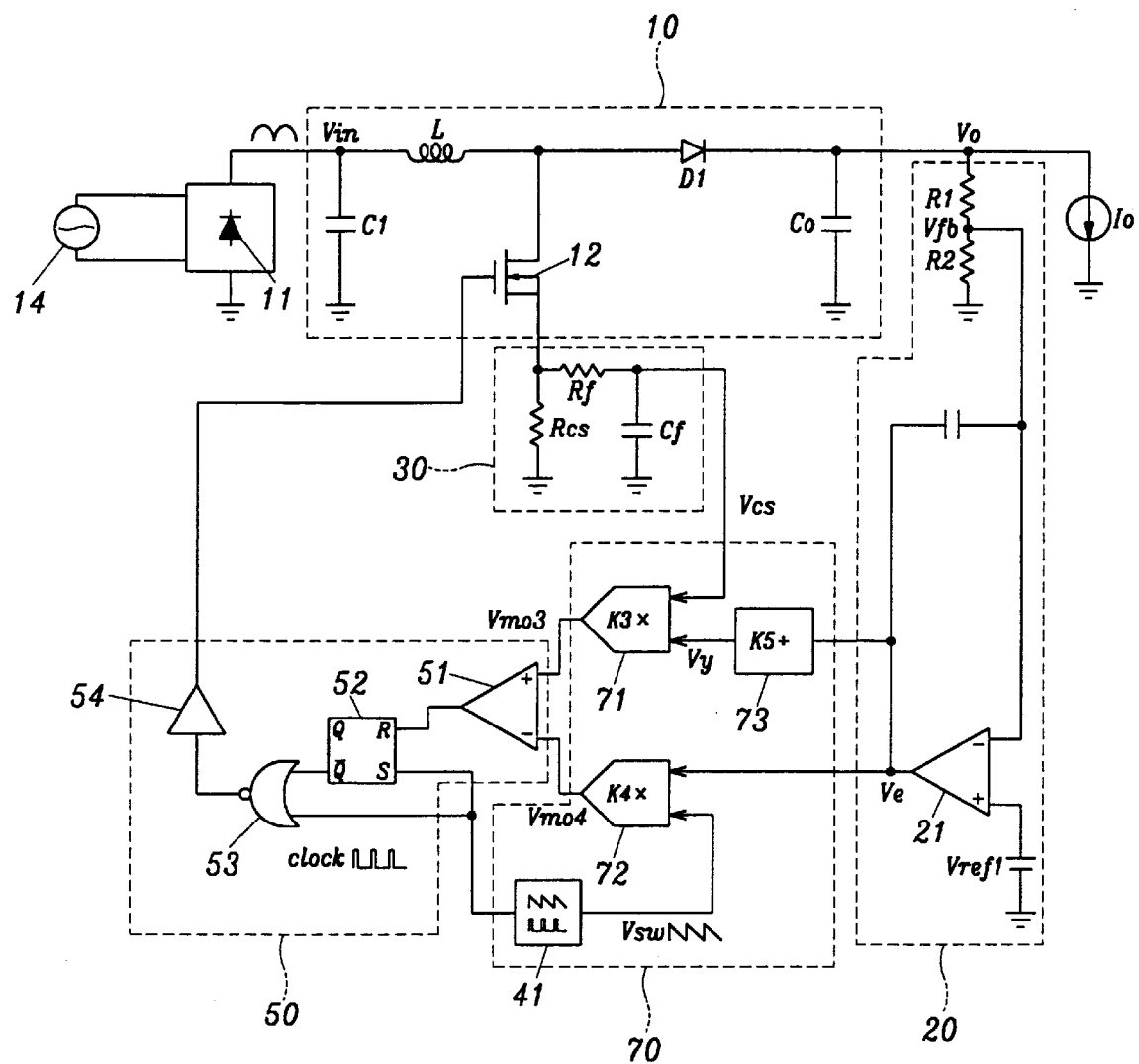
FIG. 8 is a schematic diagram of a PFC circuit according to a third preferred embodiment of the present invention.

FIG. 8 shows a PFC circuit according to a third embodiment of the present invention. As shown, the PFC circuit is comprised of a boost converter 10, an error amplification unit 20, a current detector 30, a comparative wave generator 70, and a switching, driver 50. The boost converter 10, the error amplification unit 20, the current detector 30, and the switching driver 50 shown in FIG. 8 are same to those shown in FIG. 1.

The comparative wave generator 70, comprised of multipliers 71 and 72 and a divider 73, generates comparative waves to determine the OFF point of the switching MOSFET 12. The divider 73 divides a gain K5 by the output voltage Ve of the error amplifier 21 and outputs $$Vy\left(Vy = \frac{K5}{Ve}\right).$$

The multiplier 71 multiplies the output voltage Vy of the divider 73 and the output voltage Vcs of the current detector 30 by a gain K3 and outputs a voltage Vmo3. The multiplier 72 multiplies the output voltage Ve of the error amplifier 21 and the reverse sawtooth waves by a gain K4 and outputs a voltage Vmo4. The output voltages Vmo3 and Vmo4 of the multipliers 71 and 72 are given by, respectively:

$$Vmo3 = K3 \cdot Vcs \cdot Vy = K3 \cdot Vcs \cdot \frac{K5}{Ve} \quad \text{Equation (13)}$$

$$Vmo4 = K4 \cdot Ve \cdot Vsw = G_{14} \cdot Vsw \quad \text{Equation (14)}$$

Figure 9:
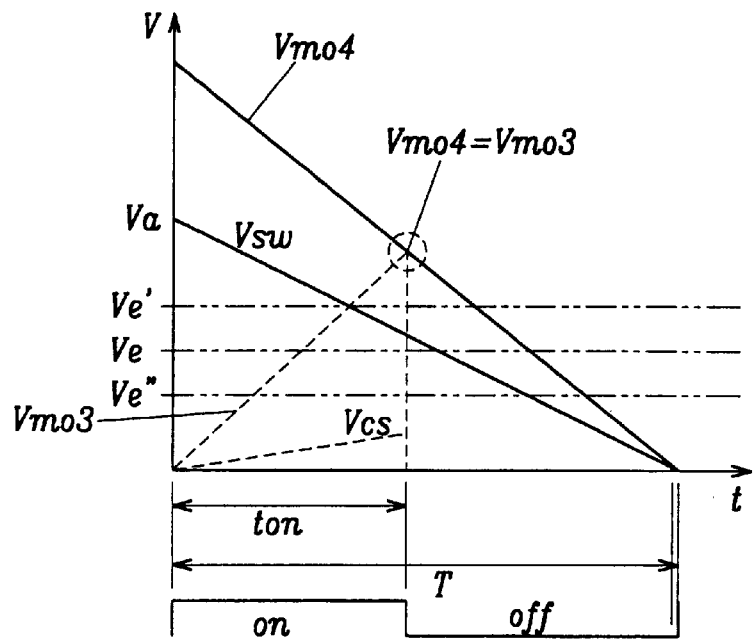
FIG. 9 is a graph illustrating the values of parameters during ON, OFF times of a switching MOSFET shown in FIG. 8.

Next, referring to FIGS. 8 and 9, the operation of the PFC circuit is described.

Referring to FIG. 8, the output voltage Vmo4 of the multiplier 72 is, as shown by Equation 12, the product of the reverse sawtooth waves and a constant gain $G_{14}$, and is represented in FIG. 9. Because the output voltage Vmo3 of the multiplier 71 is, as shown by Equation 13, proportional to the output voltage Vcs of the current detector 30, the voltage Vmo3 starts to increase when the switching MOSFET 12 is turned on (i.e., at the point where the reference clock signal of the oscillator 41 changes to a falling edge).

As the output voltage Vmo3 of the multiplier 71 becomes to increase, the voltage Vmo3 eventually becomes equal to the output voltage Vmo4 of the multiplier 72, and at this point, the switching MOSFET 12 is turned off. When the reference clock signal of the oscillator 41 changes to a falling edge, this switching MOSFET 12 is turned on again, and the above process is repeated.

When the respective output voltages Vmo3 and Vmo4 of the multipliers 71 and 72 become equal, the relation between the Vmo3 and Vmo4 is found by setting Vmo3=Vmo4, and substituting in from Equations 13 and 14:

$$K3 \cdot Vcs \cdot \frac{K5}{Ve} = K4 \cdot Ve \cdot Va \cdot \left(1 - \frac{t_{on}}{T}\right) \quad \text{Equation (15)}$$

where, Va is the voltage of the reverse sawtooth waves when the switching MOSFET is turned on, and T is the period of the reverse sawtooth waves.

By substituting Equations 1 and 5 into Equation 15, one obtains:

$$iL = \frac{K4 \cdot Ve^2 \cdot Va \cdot Vin}{K3 \cdot K5 \cdot Rcs \cdot Vout} = Gm2 \cdot Vin \quad \text{Equation (16)}$$

From Equation 16, it is shown that a magnitude of the current iL flowing to the inductor L is determined by the input voltage Vin and a constant gain Gm2, and has identical phase with the input voltage. That is, the waveforms of the current iL flowing to the inductor correspond to those of the input voltage, and accordingly, the PFC circuit according to the third embodiment of the present invention enables high power factor correction.

Figure 10:
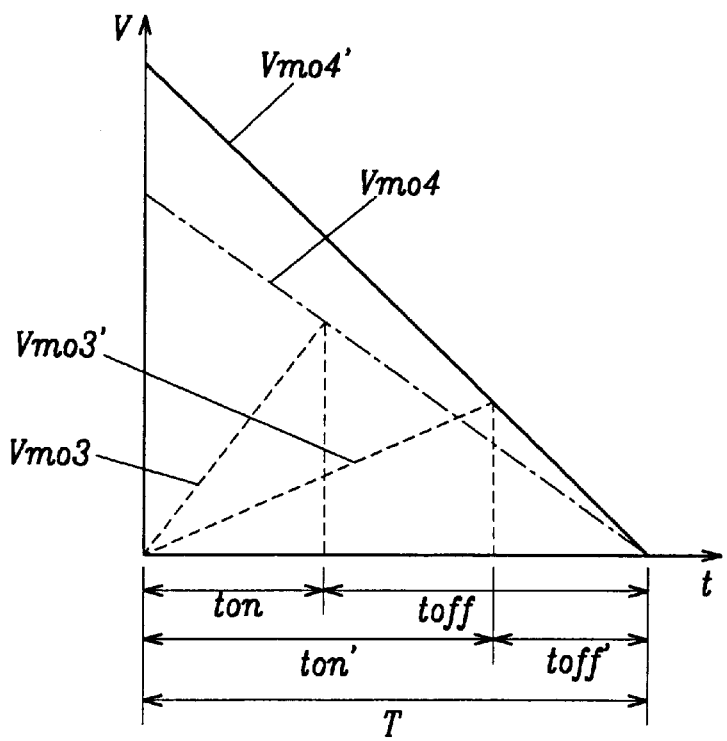
FIG. 10 is a graph illustrating duty ratio and operating point changes where output voltage is reduced by an increase in load of FIG. 8.
Figure 11:
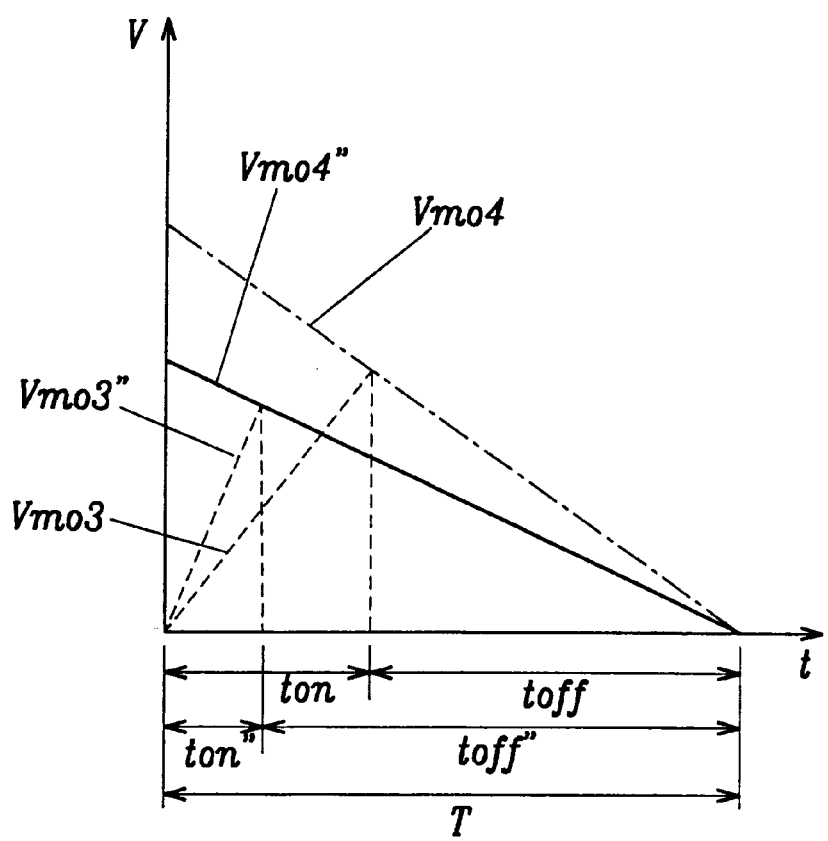
FIG. 11 is a graph illustrating duty ratio and operating point changes where output voltage is increased by a reduction in load of FIG. 8.

Next, the operation of the PFC circuit according to the third embodiment of the present invention will be described when the output voltage Vout is fluctuated with reference to FIGS. 8, 10, and 11. FIG. 10 shows a graph where output voltage Vout is reduced by an increase in load, and FIG. 11 shows a graph where output voltage Vout is increased by a reduction in load.

It is assumed that when the load is increased, the output voltage Vout is reduced to Vout'. Then, the voltage Vfb is reduced, and the output voltage Ve of the error amplifier 21 is increased to Ve'. Therefore, the slope of the output voltage Vmo4 of the multiplier 72 is, as shown in FIG. 10, is shifted to Vmo4', and the slope of the output voltage Vmo3 of the multiplier 71 is shifted to Vmo3'. Hence, since the ON interval $t_{on}$ of the switching MOSFET 12 is increased to $t_{on}'$, the output current is increased and the output voltage Vout is increased.

If it is assumed that the load is reduced and that the output voltage Vout is increased to Vout", the voltage Vfb is increased, and the output voltage Ve of the error amplifier 21 is reduced to Ve". Therefore, the slope of the output voltage Vmo4 of the multiplier 72 is, as shown in FIG. 11, is shifted to Vmo4", and the slope of the output voltage Vmo3 of the multiplier 71 is shifted to Vmo3". Hence, since the ON interval $t_{on}$ of the switching MOSFET 12 is reduced to $t_{on}"$, the output current is reduced and the output voltage Vout is reduced.

The PFC circuit according to the third embodiment of the present invention covers a wider duty ratio compared with the PFC circuit according to the first embodiment.

As shown by FIGS. 10 and 11, in the PFC circuit according to the third embodiment of the present invention, when the output voltage Vout is fluctuated such that the line representing the output voltage Vmo4 of the multiplier 72 is fluctuated, the slope of the output voltage Vmo3 of the multiplier 71 is concurrently fluctuated to compensate for the fluctuation of the line representing the voltage Vmo4, and thereby, the PFC circuit according to the third embodiment of the present invention provides a wider adjustment of the duty ratio than does the PFC circuit according to the first embodiment.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A Power Factor Correction circuit using a reverse sawtooth waveform, comprising:
    a converter which includes an inductor coupled to an input voltage, a switch controlling a current flowing through the inductor, and a rectifier for rectifying an output voltage of the inductor and supplying the rectified voltage to a load;
    a current detector coupled to the switch for detecting the current flowing through the inductor when the switch is turned on;
    an error amplification unit which includes a divider for dividing the output voltage of the converter, and an error amplifier for amplifying a difference voltage between the divider output voltage and a reference voltage;
    a comparative wave generator which includes an oscillator generating a reverse sawtooth waveform having a sawtooth period and a decreasing wave segment in each sawtooth period, the generator further including a reference clock signal having a clock period equal to the sawtooth period and a multiplier multiplying an output voltage of the error amplifier and the reverse sawtooth waveform by a predetermined gain; and
    a switching driving means for turning off the switch when an output voltage of the current detector is equal to an output voltage of the multiplier of the comparative wave generator, and turning on the switch when a state of the reference clock signal is changed.

2. The circuit of claim 1, wherein the current detector includes a resistor and a capacitor.

3. The circuit of claim 1, wherein the converter is a boost converter.

4. The circuit of claim 1, wherein the switching driving means comprises:
    a comparator comparing the output voltage of the current detector with the output voltage of the multiplier;
    a flip-flop receiving the output voltage of the comparator as a reset input signal, and the reference clock signal of the oscillator as a set input signal;
    a logical NOR gate receiving an inverted output signal of the flip-flop and the reference clock signal of the oscillator as input signals; and
    a switching driver turning on or off the switch responsive to an output signal of the logical NOR gate.

5. The circuit of claim 1, wherein the switch is a switching Metal Oxide Semiconductor Field-Effect Transistor (MOSFET).

6. The circuit of claim 1, wherein the wave segments start to decrease at a start of each sawtooth period, and the reference clock signal changes to an ON state at the start of the sawtooth period.

7. A Power Factor Correction circuit using a reverse sawtooth waveform, comprising:
    a converter which includes an inductor coupled to an input voltage, a switch controlling a current flowing through the inductor, and rectifier for rectifying an output voltage of the inductor and supplying the rectified voltage to a load;

a current detector coupled to the switch for detecting the current flowing through the inductor when the switch is turned on;

an error amplification unit which includes a divider for dividing the output voltage of the converter, and an error amplifier for amplifying a difference voltage between the divider output voltage and a first reference voltage;

a comparative wave generator which includes an oscillator generating a reverse sawtooth waveform having a sawtooth period and a decreasing wave segment in each sawtooth period, the generator further including a reference clock signal having a clock period equal to the sawtooth period, a first subtractor subtracting a second reference voltage from an output voltage of the error amplifier, a second subtractor subtracting an output voltage of the first subtractor from a third reference voltage, a first multiplier multiplying the reverse sawtooth waveform and an output voltage of the first subtractor by a first gain, and a second multiplier multiplying the output voltage of the second subtractor and an output voltage of the current detector by a second gain; and a switching driving means turning off the switch when an output voltage of the first multiplier is equal to an output voltage of the second multiplier, and turning on the switch when a state of the reference clock signal is changed.

8. The circuit of claim 1, wherein the current detector includes a resistor and a capacitor.

9. The circuit of claim 7, wherein the converter is a boost converter.

10. The circuit of claim 7, wherein the switching driving means comprises:

a comparator comparing the output voltage of the first multiplier with the output voltage of the second multiplier;

a flip-flop receiving the output voltage of the comparator as a reset input signal and the reference clock signal of the oscillator as a set input signal;

a logical NOR gate receiving an inverted output signal of the flip-flop and the reference clock signal of the oscillator as input signals; and a switching driver turning on or off the switch according to an output signal of the logical NOR gate.

11. The circuit of claim 7, wherein the switch is a switching Metal Oxide Semiconductor Field-Effect Transistor (MOSFET).

12. The circuit of claim 1, wherein the wave segments start to decrease at a start of each sawtooth period, and the reference clock signal changes to an ON state at the start of the sawtooth period.

13. A Power Factor Correction circuit using a reverse sawtooth waveform, comprising:

a converter which includes an inductor coupled to an input voltage, a switch controlling a current flowing through the inductor, and rectifier for rectifying an output voltage of the inductor and supplying the rectified voltage to a load;

a current detector coupled to the switch for detecting the current flowing through the inductor when the switch is turned on;

an error amplification unit which includes a first divider for dividing an output voltage of the converter, and an error amplifier amplifying a difference voltage between a voltage output by the first divider and a reference voltage;

a comparative wave generator which includes an oscillator generating a reverse sawtooth waveform having a sawtooth period and a decreasing wave segment in each sawtooth period, the generator further including a reference clock signal having a clock period equal to the sawtooth period, a second divider dividing a first gain by an output voltage of the error amplifier, a first multiplier multiplying the reverse sawtooth waveform and an output voltage of the error amplifier by a second gain, and a second multiplier multiplying an output of the second divider and an output voltage of the current detector by a third gain; and a switching driving means turning off the switch when an output voltage of the first multiplier is equal to an output voltage of the second multiplier, and turning on the switch when a state of the reference clock signal is changed.

14. The circuit of claim 1, wherein the current detector includes a resistor and a capacitor.

15. The circuit of claim 13, wherein the converter is boost converter.

16. The circuit of claim 13, wherein the switching driving means comprises:

a comparator comparing the output voltage of the first multiplier and the output voltage of the second multiplier;

a flip-flop receiving the output voltage of the comparator as a reset input signal, and the reference clock signal of the oscillator as a set input signal;

a logical NOR gate receiving an inverted output signal of the flip-flop and the reference clock signal of the oscillator as input signals; and a switching driver turning on or off the switch according to an output signal of the logical NOR gate.

17. The circuit of claim 13, wherein the switch is a switching MOSFET.

18. The circuit of claim 1, wherein the wave segments start to decrease at a start of each sawtooth period, and the reference clock signal changes to an ON state at the start of the sawtooth period.

* * * * *